June 15, 1943.  C. J. CRANE ET AL  2,321,582
MARKER BEACON AND LANDING GEAR CONTROLLED THROTTLE ENGINE
Filed Sept. 26, 1940  2 Sheets-Sheet 1
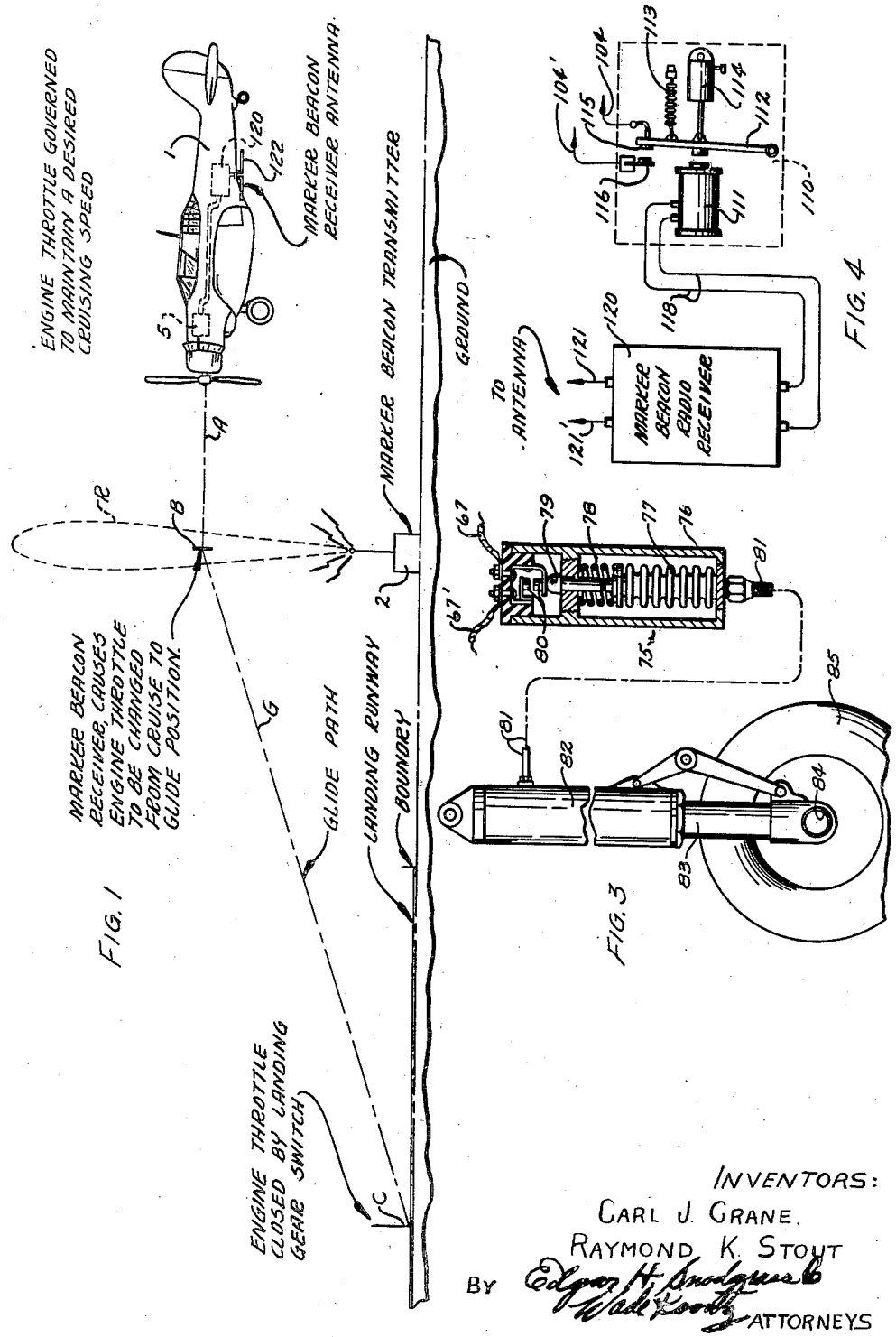
INVENTORS:
CARL J. CRANE.
RAYMOND K. STOUT
BY
ATTORNEYS

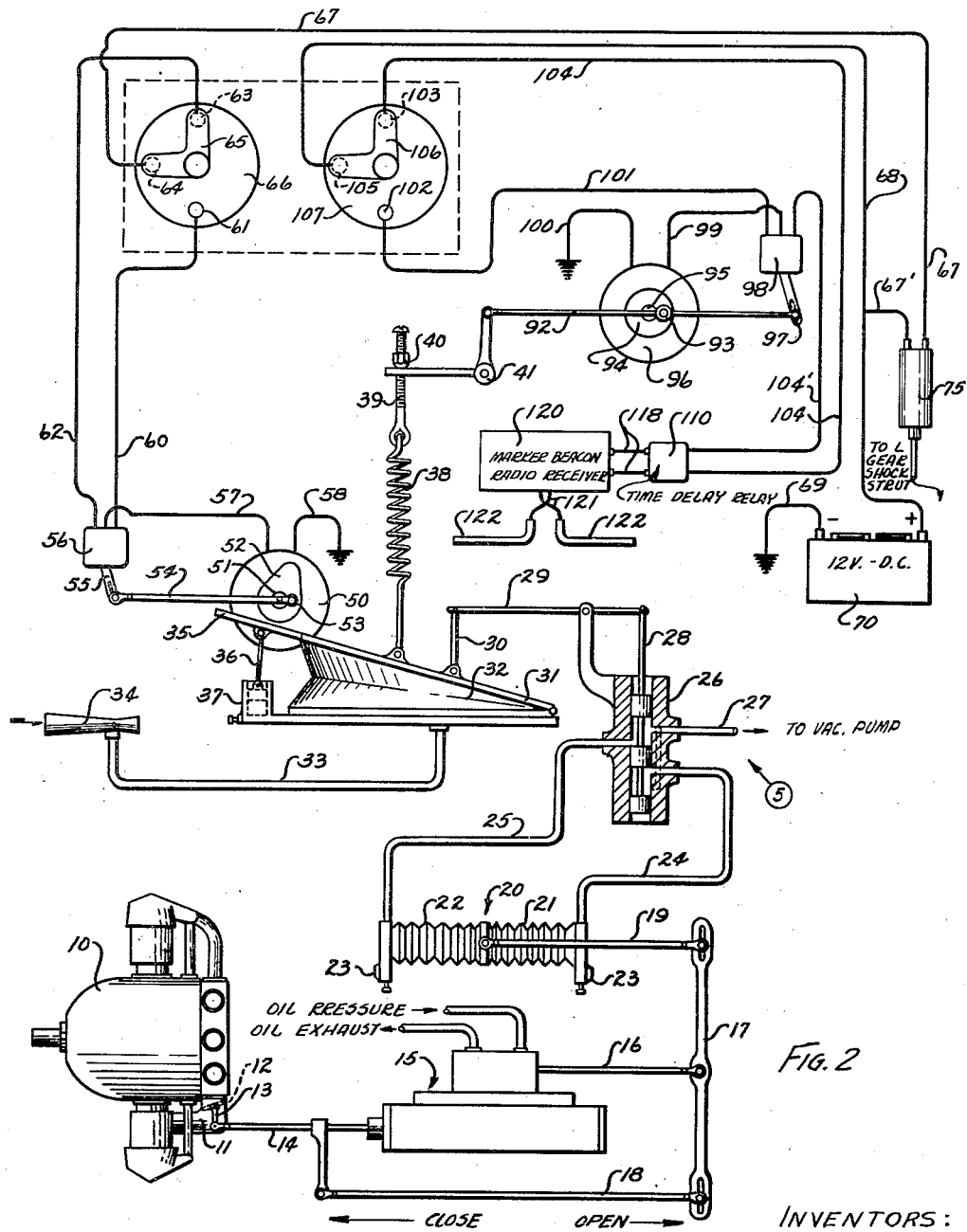

Patented June 15, 1943

2,321,582

UNITED STATES PATENT OFFICE 2,321,582

MARKER BEACON AND LANDING GEAR CONTROLLED THROTTLE ENGINE

Carl J. Crane and Raymond K. Stout, Dayton, Ohio

Application September 26, 1940, Serial No. 358,438

2 Claims. (Cl. 244—77)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an automatic engine-control system employed in controlling the power plant of an aircraft, particularly during the course of an instrument landing.

The subject matter of this invention may be employed in the blind landing system disclosed in application Serial No. 287,310, filed July 29, 1939, entitled "Aircraft-automatic take off flight and landing," in the names of Carl J. Crane, George V. Holloman, Raymond K. Stout, and Constantin D. Barbulesco, or may be employed in conjunction with the well-known "Army Air Corps blind landing system" employing two radio compass and associated marker beacon radio transmitting stations aligned with the airport landing runway. In the Army Air Corps system and the system disclosed in the aforementioned application Serial No. 287,310, the control of the aircraft in the vertical plane for such conditions as level flight, rate of ascent or descent, and airspeed, is effected by control of the power output of the power plant, since if the aircraft is manually or automatically maintained in a level flight attitude corresponding to the flight attitude for cruising speed and the power output is kept constant, the aircraft will fly at a constant altitude with a constant airspeed, while if the power output of the power plant is increased the aircraft will ascend at a rate dependent on the excess power and conversely, if the power output is reduced below the cruising speed requirement the aircraft will descend at a substantially constant rate. It is thus possible to control the aircraft in the vertical plane without employing a radio glide path beam.

The control system in accordance with the invention comprises a servo mechanism which may be of electric, hydraulic or pneumatic type, which is adapted to normally set the aircraft engine throttle in a position corresponding to a desired cruising speed, a marker beacon receiver which is adapted to control the servo device to set the engine throttle in a position such that the aircraft will descend in a power glide at a predetermined rate of descent, the marker beacon receiver cooperating with a particular ground transmitting station aligned with and located at a predetermined distance from a landing runway and a landing-gear-actuated switch operative on contact of the aircraft with the landing runway to cause the said servo device to position the engine throttle in the closed position. The control system also includes a plurality of switches operative to reset the control system and to determine the sequence of operations.

The principal object of the invention is the provision of an aircraft engine control device including servo mechanism operative to selectively position the engine throttle in any one of a plurality of positions corresponding to definite flight speeds of the associated aircraft, radio-signal-responsive means operative in cooperation with a transmitting station on the ground to cause said servo mechanism to position the engine throttle to cause the aircraft to descend at substantially a constant rate and control means actuated upon contact of the aircraft with the ground to cause said servo mechanism to position the engine throttle in the closed or "idle" position.

A further object of the invention is the provision in a control system for the power plant of an aircraft, of servo mechanism operative to normally maintain the engine throttle in a position to maintain a desired air speed, of a radio receiver responsive to the directional radiation of a transmitter station on the ground and operative within the zone of said radiation to control said servo mechanism to position the engine throttle corresponding to the power gliding speed of said aircraft.

Another object of the invention is the provision in an aircraft power plant control device, of servo means for positioning the aircraft engine throttle in any one of a plurality of predetermined positions, of radio-signal-responsive means operative to cause said servo means to position said engine throttle in one of said predetermined positions corresponding to a predetermined aircraft gliding speed and of means responsive to the contact of the aircraft with the ground for causing said servo means to position said engine throttle in another of said predetermined positions corresponding to the "idle" speed of said power plant.

A further object of the invention is the provision in apparatus of the character described of a means responsive to the air speed of an aircraft operative to vary the power output of the aircraft engine to maintain the air speed substantially constant at a predetermined cruising speed and radio-signal-responsive means operative to vary the setting of said air-speed-responsive means to control the power output of said engine, to maintain a substantially constant gliding speed.

Other objects not specifically enumerated above will become apparent by reference to the detailed description in the specification and the appended drawings in which:

Fig. 1 is a diagrammatic sketch illustrating the sequence of operations of the engine throttle control during the course of an instrument landing;

Fig. 2 is a view illustrating the elements of the aircraft engine throttle control mechanism;

Fig. 3 is a detail view partly in section illustrating the landing-gear-operated switch; and Fig. 4 is a view illustrating the details of the relay controlled by the marker beacon radio receiver.

Referring now to Fig. 1, if it is assumed that the aircraft 1 is flying along the flight path A directionally aligned with a landing runway, the engine throttle will be governed by control mechanism, generally indicated by the reference numeral 5, in accordance with the invention, so that it will approach the plane of the vertical radiation of a marker beacon radio transmitter 2 of well-known type, at a substantially constant air speed corresponding to a desired preselected cruising speed. When the airplane 1 passes into the plane of the marker beacon transmitter radiation R at point B, the marker beacon receiver antenna 122 on airplane 1 transmits the marker beacon signal to a marker beacon receiver 120 connected thereto, which receiver—among other things—is operative to close a relay, which in turn causes the throttle-control mechanism to change the throttle setting from cruising to glide position, the airplane 1 then descending along the glide path G at substantially a constant rate of descent. Upon the airplane landing gear's contacting the runway as at C, a switch controlled thereby causes the throttle-control mechanism to position the engine throttle in the "idle" running position. The details of the novel throttle-control mechanism illustrated in Figs. 2 to 4 inclusive and hereinafter referred to by the term "throttle engine" as used in the art, will now be described.

Referring now to Fig. 2, the throttle-control mechanism, or throttle engine, indicated by the reference numeral 5 in Fig. 1 is shown as adapted to control an aircraft engine indicated by the reference numeral 10. The engine 10 is provided with the usual carburetor 11 having a throttle-control valve 12 actuated by a throttle-control lever 13. The throttle-control lever 13 is connected to a reciprocable piston rod 14 of a hydraulic servomotor generally indicated by the reference numeral 15. The servomotor 15 is of a well-known type operated by oil under pressure supplied from the engine oiling system. The servomotor is adapted to be cotrolled by a conventional pilot valve (not shown) which in turn is actuated by the valve rod 16. The valve rod 16 is pivotally connected at its outer end to a floating lever 17 between the ends thereof. At its lower end the floating lever 17 is pivotally connected to one end of a follow-up lever 18, the other end of which is rigidly connected to the servomotor piston rod 14 and partakes in the reciprocating motion thereof. At its upper end the floating lever 17 is pivotally connected to the outer end of a control rod 19, which in turn is connected at its inner end to a bellows device generally indicated by the reference numeral 20. The bellows device 20 comprises a pair of opposed metal bellows 21 and 22 respectively, which are respectively connected by means of conduits 24 and 25 to a pilot control valve body 26. Each of the bellows is also connected to the atmosphere by means of needle-controlled bleed valves 23. The pilot valve body 26 is provided with a conduit 27 which is adapted to be connected to an engine-driven vacuum pump, or other convenient vacuum source (not shown). The pilot valve body 26 has reciprocably mounted therein a pilot valve 28 which is adapted to control the communication between the vacuum conduit 27 and the conduits 24 and 25 respectively. In the position as shown in Fig. 2, the pilot valve 28 allows an equal reduction in pressure in the conduits 24 and 25, which will cause no resulting deflection of the bellows device 20. If, however, the pilot valve 28 is moved upward from its neutral position, communication between the vacuum conduit 27 and the conduit 25 will be restricted, permitting a greater reduction in pressure in the bellows 21, causing a deflection of the bellows device 20 toward the right. This deflection of the bellows device 20 causes a clockwise rotation of the floating link 17 about its lower pivot, causing the pilot valve rod 16 of servomotor 15 to be moved to the right. This motion of the pilot valve rod 16, in turn, will cause a displacement of the servomotor piston toward the right an amount proportional to the displacement of the valve rod 16, the follow-up link 18 restoring the pilot valve of servomotor 15 to its neutral position after the piston rod 14 has opened the engine throttle an amount proportional to the displacement of control rod 19 and pilot valve 28. Similarly, a downward movement of the pilot valve 28 will cause a movement of the servomotor piston rod 14 to the left, as seen in Fig. 2, causing a proportionate closing of the throttle valve 12.

The pilot valve 28 is pivotally connected to one end of a lever 29, the other end of which is connected by means of a link 30 to the movable portion 31 of a bellows 32, the pilot valve thus moving an amount proportional to the deflection of the movable portion 31 of the bellows. The bellows 32 is connected by means of a conduit 33 with a Venturi tube 34 adapted to be mounted on an airplane 1 (Fig. 1) so as to be exposed to the air stream. The movable portion 31 of the bellows 32 is adapted to be connected to the lower end of a control spring 38, the upper end of which is connected to a rod 39 connected to one arm of a bell crank 41 in adjustable relation determined by an adjusting nut 40. The movable element 31 of the bellows 32 is provided with an extension arm 35 which is adapted to be connected by means of a link 36 to the piston of an adjustable air dashpot 37. If the bell crank 41 is held stationary and a predetermined tension is placed on a control spring 38 by means of the terminal rod 39 and the adjusting nut 40, the upper movable portion 31 of the bellows 32 will be deflected upward, causing a simultaneous downward movement of the pilot valve 28 an amount sufficient to cause the servomotor 15 to move the throttle valve 12 of engine 10 to the wide-open position. As the aircraft increases in speed, the suction effect created by the Venturi tube 34 will be sufficient to cause a downward movement of the upper portion of the bellows 32 until the force acting on the bellows due to the reduced pressure produced in conduit 33 is just sufficient to balance the loading of the control spring 38 as determined by the adjusting nut 40. In this balanced position the pilot valve 28 will be returned to its neutral position and the throttle 12 of engine 10 will be moved to a position corresponding to a desired cruising speed of the aircraft, this cruising speed being determined by the initial loading of the spring 38. The elements 14 to 46, inclusive, form the structure of a well-known throttle-control device incorporated in the "Sperry automatic pilot" and disclosed in greater detail in United States Patent No. 2,160,194, granted to Mortimer F. Bates, the structure of which per se forms no part of the invention claimed herein.

An electric motor 50 is mounted adjacent the extension 35 of the bellows 32; and the shaft 51 thereof is provided with a cam 52 adapted, in the position shown in Fig. 2, to remain out of contact with the extension arm 35 of the bellows. When the motor 50, however, rotates the cam 52 into a position 180° from the position indicated in Fig. 2, the high part of the cam will engage the extension portion 35 of the bellows 32, forcing the bellows to collapse, thereby causing an upward movement of the pilot valve 28 an amount sufficient to actuate servomotor 15 to move the engine throttle 12 to the closed, or "idle" position. It is thus seen that the cam 52 serves as a means to automatically override the effect of control spring 38 and venturi 34 to cause a movement of the throttle to the closed position. The cam 52 is provided with a crankpin 53 having one end of a link 54 mounted thereon, the other end of the link 54 being pivotally secured to a control arm 55 of a snap-action follow-up switch 56. The control arm 55 carries a contact (not shown) which is electrically connected by means of conductor 57 to the motor 50, the other connection 58 thereof being suitably grounded to the negative terminal of a power source. The contact actuated by the control arm 55 is adapted to engage either of a pair of contacts (not shown) respectively connected to the conductors 60 and 62. The conductor 60 is electrically connected to a contact point 61 of a switch generally indicated by the reference numeral 66, and the conductor 62 is similarly connected to a contact point 63 of the switch. A third contact point 64 of the switch 66 is electrically connected by means of conductor 67, landing-gear-actuated switch 75, and conductor 67' to a conductor 68 electrically connected to the positive terminal of a direct current battery indicated by the reference numeral 70, the negative power supply terminal 69 of the battery 70 being suitably grounded, all conductors which connect to the negative terminal of the battery being similarly indicated by the conventional ground symbol. The switch 66 is provided with a double-arm switch blade 65 which is adapted to be manually actuated into either of two positions.

The landing gear switch 75, as seen in Fig. 3, comprises a cylindrical casing 76 which has mounted therein an expansible metal bellows 77, the motion of which is opposed by a control spring 78. Any outward movement of the bellows 77 will cause the follower rod 79 to cause a closing of the electrical contacts 80 to complete an electrical circuit between the conductors 67 and 67'. The expansible metal bellows 77 is connected by means of a flexible high-pressure conduit 81 to the cylinder 82 of a conventional aircraft landing gear shock strut which is provided with a piston rod 83 having a conventional stub axle 84 mounted at right angles thereto on its lower end. The stub axle 84 serves as a mounting for the landing gear wheel 85.

When the aircraft 1 (Fig. 1) is on the ground, there will be sufficient fluid pressure developed in the conduit 81 to cause the expansible bellows 77 to expand upward against the resistance of the spring 78 an amount sufficient to cause a closing of the resiliently mounted contacts 80, thus completing the electrical circuit between the conductors 67 and 67', as previously described. When the airplane leaves the ground, the piston rod 83 of the shock strut will move downward, relieving the fluid pressure within the cylinder of the shock strut and the expansible metal bellows 77, causing spring 78 to force the bellows downward to release the engagement between the contacts 80 and, consequently, opening the electrical connection between the conductors 67 and 67'.

Referring again to Fig. 2, if it is assumed that the cam 52 is in a position 180° from the position shown in Fig. 2, the switch arm 55 will be in its extreme position to the left of the position shown in Fig. 2. Similarly, the landing gear switch 75 will be closed when the airplane is on the ground, allowing current to flow from battery 70 through conductors 67' and 67 to the switch point 64 of switch 66. With the switch blades 65 in the position as shown in Fig. 2, current can then pass from switch contact 64 to switch contact 63, conductor 62 and the contact of switch 56 associated therewith, to the contact actuated by switch arm 55, to conductor 57 and motor 50, the circuit being completed by motor conductor 58 to the negative terminal of battery 70. The motor 50 will then rotate in a clockwise direction until the cam 52 is in the position as shown in Fig. 2, the link 54 having in the meantime moved switch arm 55 to the extreme right position, as seen in Fig. 2, interrupting the supply of power to the motor 50 and stopping the motor with the cam 52 out of engagement with the extension arm 35 of the bellows 32. The control spring 38 will then be operated to open the engine throttle to the wide-open position, and Venturi tube 34 will be operative to return the throttle to the cruising speed position after the airplane takes off from the ground and acquires an air velocity sufficient to create a reduced pressure within bellows 32 to counterbalance the loading of spring 38 in the manner previously described. The Venturi tube 34 during flight will then be operative to maintain the airplane engine throttle in a position such as to maintain the speed of the aircraft substantially constant, since any increase in speed above the preselected cruising speed will cause an increased vacuum within the bellows 32, which will in turn cause a sufficient closing of the engine throttle to again return the air speed to the predetermined value. Similarly, if the speed of the airplane should decrease below the predetermined cruising speed, the pressure within the bellows 32 will begin to approach atmospheric pressure, allowing the control spring 38 to move the upper portion of the bellows 32 in an upward direction, causing pilot valve 28 to move downward with a consequent opening of the throttle valve 12 an amount sufficient to restore the aircraft speed to the preselected cruising value. After the airplane is in the air the pilot can manually rotate the switch blade 65 into a position such as to interconnect the contacts 61 and 64 of the switch 66. At this time, however, the landing gear switch 75 is open due to the extension of the shock strut 82—83 of Fig. 3, so that no current can flow from the battery 70 to the switch point 64. The Venturi tube 34 and bellows 32 continue to govern the speed of the engine 10 to maintain the speed of the aircraft substantially constant. However, upon the aircraft's contacting a landing runway, sufficient fluid pressure will be built up in the conduit 81 (Fig. 3) to cause the contacts 80 of the landing gear switch 75 to be closed, completing a circuit from battery 70, conductor 68, and conductors 67' and 67 in series with switch 75 to the switch contact point 64 of switch 66. Current will then flow to switch contact 61 and conductor 60 to the motor conductor 57, causing the motor 50 to be energized and to rotate in a clockwise direction until cam 52 depresses the extension arm 35 of bellows 32 in a downward direction a sufficient amount to cause the pilot valve 28 to control the servomotor 15 to move the throttle to the closed, or "idle" position. The position of cam 52 will then be 180° from the position as shown in Fig. 2, and link 54 will move the switch control arm 55 of the switch 56 to the extreme left position, interrupting the supply of power from conductor 60 to the conductor 57, thus de-energizing the motor 50 and leaving the cam 52 in the above-noted position.

In order to change the loading of the control spring 38 an amount sufficient to cause the throttle engine to change the throttle setting from the cruising position to the gliding position, the bell crank 41, previously noted as serving as a support for the upper end of the spring 38, has one of its arms connected to a link 92 which is eccentrically pivotal as at 93 to a crank disk 94 mounted on the ends of the armature shaft 95 of an electric motor 96. The outer end of the link 92 is connected to the switch arm 97 of a follow-up switch 98, identical in construction with the previously described switch 56 and functioning in a similar manner. The switch arm 99 carries a contact (not shown) which is electrically connected by means of conductor 99 to supply current to the motor 96, the other motor lead 100 being suitably grounded to the negative terminal of the battery 70. The contact carried by the switch arm 97 is adapted to engage a contact (not shown) electrically connected by means of conductor 101 to the switch point 102 of a manually controlled switch 107 similar in construction to the previously described manually controlled switch 66. The contact carried by the switch arm 97 is also adapted to engage a contact (not shown) electrically connected to a conductor 104' which in turn is serially connected through a time-delay relay 110 to the conductor 104, which in turn is connected to the switch contact point 103 of the switch 107. A third contact 105 of the switch 107 is connected to the positive power supply lead 68 of the battery 70. The switch 107 is provided with a double arm switch blade 106 adapted to be moved in two positions so as to electrically connect switch point 105 with either of switch points 102 or 103.

The time-delay relay 110 is connected by means of the output terminals 118 to a marker beacon radio receiver 120 of well-known type, which is connected by means of the leads 121 to the antenna 122 previously noted with reference to Fig. 1. As seen in Fig. 4, the time-delay relay 110 comprises a relay coil 111 connected to the output leads 118 of the marker beacon receiver 120 and is adapted to be energized upon the marker beacon receiver's generating a signal in its output terminals. The relay coil 111 has associated therewith a pivoted relay arm 112 yieldingly urged in one direction by spring 113 and having connected therewith a conventional adjustable air dashpot 114 which serves as a time-delay mechanism.

The relay arm 112 is provided with a switch contact 115 which is adapted to engage a yieldingly mounted contact 116 whenever the relay arm 112 is attracted by the core of the relay coil 111. The contacts 115 and 116 are respectively connected to the conductors 104 and 104' and adapted to complete an electrical circuit between these conductors when engaged. The relay arm 112 when attracted by the relay coil 111 causes the contacts 115 and 116 to engage, and further movement of the relay arm causes a slight deflection of the yielding mounting of the contact 116, the dashpot 114 permitting the free movement of the relay arm in the closing direction but delaying the disengagement of contacts 115 and 116 for a sufficient interval of time to insure the necessary operation of the electric motor 96.

Referring again to Fig. 2, if we assume that the aircraft is on the ground and it is desired to apply tension load to the control spring 38 to attain a desired preselected cruising speed, and assuming that the crank disk 94 of motor 96 is in a position 180° from that shown in Fig. 2, the arm of bell crank 41 supporting the upper spring terminal 39 of the spring 38 will be moved downward, releasing a portion of the tension loading on the spring 38. If then the switch arm 106 of switch 107 is moved to a position such that the switch contact points 102 and 105 are interconnected, current may then flow from conductor 68 to conductor 101 and conductor 99 by means of the associated contacts of follow-up switch 98, the switch arm 97 at this time being in a position to the extreme left of that shown in Fig. 2. Motor 96 will then be energized to rotate in a clockwise direction into the position shown in Fig. 2, switch arm 97 interrupting the flow of current from the conductor 101 to conductor 99. The link 92 will then move to the right into the position shown in Fig. 2, elevating the adjustable spring terminal 39 of the control spring 38, applying a tension load to the spring 38 corresponding to the desired cruising speed loading determined by the adjustment nut 40, as previously described.

After the aircraft is in the air, the pilot rotates the switch blade 106 into the position, as shown in Fig. 2, interconnecting switch contacts 103 and 105. Upon the marker beacon antenna 122 receiving a signal from the marker beacon transmitter 2 (Fig. 1) the marker beacon receiver 120—among other things—will cause relay 110 to be closed in the manner previously described with reference to Fig. 4. Current will then flow from conductor 68 to conductor 104, through time-delay relay 110 to conductor 104' through the contacts of switches 98 to motor lead 99, energizing the motor 96 for a sufficient length of time due to the time-delay feature of relay 110, as previously mentioned, to cause the crank disk 94 to be rotated in a clockwise direction 180° from the position as shown in Fig. 2. The arm of bell crank 41 supporting the spring terminal 39 will then move downward an amount sufficient to release the tension load of spring 38 to the loading value corresponding to the glide condition of the engine throttle 12. This release of loading on the spring 38 allows the suction produced by Venturi tube 34 to cause a partial collapse of the bellows 32, which in turn will shift the pilot valve 28 upward an amount sufficient to cause the servomotor 15 to position the engine throttle 12 in the power gliding position. The aircraft 1 then proceeds along the glide path G in the manner previously described with reference to Fig. 1.

The manual control switches 66 and 107 can be operated independently or, if desired, may be interconnected for simultaneous operation to provide a convenient means for resetting the control system after making an instrument landing.

It will be seen that the pilot of the aircraft, by means of the above-described control system, may allow the aircraft to take off under automatic control until the aircraft reaches a desired cruising speed. By then setting switch 66 in the manner previously described, the electrical circuits associated with the motor 50 are conditioned so as to be effective in conjunction with the landing-gear-operated switch 75 to bring the engine throttle to the idling speed position upon contact of the landing gear with the landing runway. It is also seen that after the aircraft is in the air the pilot by means of the switch 107 may condition the circuits associated with the switch 96 so as to cause the throttle engine to automatically change the throttle setting from the cruising speed position to the glide speed position upon the marker beacon receiver 120 actuating relay 110, permitting the aircraft to descend at a substantially constant rate of descent, its air speed during the descent being controlled by means of the Venturi tube 34 and bellows 32 in the manner previously described, the sequence of the various above-described operations occurring in the manner described above with reference to Fig. 1.

Where a plurality of aligned marker beacon transmitters are employed in an instrument landing system of which the present invention forms a part, it is desirable that the relay 110 be actuated by a signal received from the far marker beacon transmitter, i. e., the transmitter located nearest the landing runway. This operation can be easily secured by having the radiation of the far marker beacon transmitter modulated at some selected frequency and by having the output of the marker beacon receiver fed to a filter circuit adapted to separate out the particular modulation frequency for operating the relay 110, this means for operating a control by the radiation of a particular marker beacon transmitter being well known and disclosed in United States Patent 2,133,285 granted to Francis W. Dunmore.

While a hydraulic type of throttle engine has been illustrated in the drawings, it is apparent that electric or pneumatic servomotors may be employed instead, one example of the application of marker beacon and landing gear switch-control means to an electric servomotor operative to position the engine throttle in various preselected positions being described but not claimed in copending application Serial No. 348,720, filed July 31, 1940, in the names of Carl J. Crane, George V. Holloman, and Raymond K. Stout and entitled "Electric throttle control."

While one embodiment of the invention has been illustrated and described, other modifications will become apparent to those skilled in the art as falling within the scope of the invention as defined by the appended claims.

We claim:

1. In a system for controlling an aircraft in the vertical plane by controlling the power output of the engine for propelling the aircraft, the combination with said engine of; an engine-speed-controlling means; a throttle engine operative to position said speed-controlling means in a plurality of predetermined positions, certain of said positions corresponding to the cruising, gliding, and idle speeds of said engine, respectively; means for causing said throttle engine to position said speed-control means in a predetermined cruising speed position; radio-signal-responsive means operative to cause said throttle engine to move said speed-control means from the cruising position to the gliding position, whereby said aircraft descends at a substantially constant rate; and means responsive to the contact of said aircraft with the ground to cause said throttle engine to change the position of said engine-speed-control means from the gliding position to the idle speed position.

2. In an airspeed control for an aircraft, an engine, means for controlling the speed of said engine, an airspeed responsive governor connected to said speed-control means to control the speed of said engine to maintain a substantially constant preselected airspeed, said governor including a pressure responsive element, a servomotor responsive to movement of said element and operatively connected to said speed control means, a governor modifier including a resilient element yieldingly opposing movement of said pressure reponsive means in one direction, means for loading said resilient element so that said pressure responsive element is effective to regulate the power output of said engine to maintain one particular value of the airspeed, radio signal responsive means effective to vary the loading of said resilient element by a predetermined amount to render said pressure responsive means effective to control the power output of said engine to maintain a different predetermined airspeed, power means for rendering said governor modifier ineffective and to control said servomotor to position said speed control means in the idling speed position, a landing gear actuated means for controlling the actuation of said power means, and manually actuated means for rendering said landing gear actuated means operative or inoperative to control said power means.

CARL J. CRANE.
RAYMOND K. STOUT.